UNITED STATES PATENT OFFICE.

WILBUR ALSON HENDRYX, OF DENVER, COLORADO.

METHOD OF TREATING ORES.

No. 889,129.      Specification of Letters Patent.      Patented May 26, 1908.

Application filed November 27, 1906. Serial No. 345,295.

*To all whom it may concern:*

Be it known that I, WILBUR ALSON HENDRYX, a citizen of the United States, residing at Hotel Metropole, in the city of Denver, in the county of Denver and State of Colorado, have invented new and useful Improvements in Methods of Treating Ores, of which the following is a specification.

This invention is a method of treating ores, and more particularly oxidized ores of copper, zinc and the like, by which term it is intended to include oxid and carbonate ores, and other ores which by roasting or other treatment have been rendered soluble in acids and in saline solutions.

The object of the invention is to provide a method whereby substantially complete extraction of metal from such ores may be secured while effecting a substantial economy in the quantity of acid required.

In treating an oxidized copper ore I prefer to proceed as follows: The ore in a suitable state of subdivision is charged into a tank provided with a mechanical stirring device and is thoroughly agitated therein in presence of a solution of sodium chlorid, calcium chlorid or other saline solution capable of effecting solution of the metal, such saline solution being preferably of comparatively high concentration and preferably heated to a temperature which may vary from 120 degrees Fahrenheit to the boiling point of the solution. By this treatment a substantial proportion of the metal contained in the ore, in the case of oxidized copper ores usually about 50 percent, is brought into solution. The tank may be of any suitable character and the construction of the same forms no part of my present invention; I prefer however to employ the apparatus of my prior patent 785,214, granted March 21, 1905, the parts thereof being constructed of material unaffected by the liquids employed, and the electrodes being omitted. I then add to the ore pulp, while still heated and preferably without separating the saline solution therefrom, a quantity of acid, usually sulfuric acid, substantially equivalent to the weight of metal remaining undissolved in the ore, or in the example above given to approximately 50 percent of the metal originally present in the ore. The pulp is then subjected to heat and agitation for a further period of time and until practically complete solution is effected. It will be obvious that the saline solution or any portion thereof may be separated from the residual ore before the addition of the acid, but I prefer to proceed as described in the case of most ores, and particularly in the case of such ores as are more completely and rapidly attacked by the products of double decomposition of the salt and sulfuric acid than by sulfuric acid alone.

The metal-bearing solution is separated in any desired manner, preferably by discharging the pulp upon a sand filter, and the clear solution is treated to separate the copper, preferably by precipitating the copper by scrap iron or steel in the rotary precipitating apparatus described in my copending application Serial No. 317,600, filed May 18, 1906, the precipitate being collected in filters or otherwise.

The apparatus above described has great capacity and the solution of the metals is quickly and economically accomplished; I have found in practice that a solution tank 17 feet in diameter is capable of treating approximately 40 tons of ore at a charge and that ten such charges may be treated in a day, the total capacity of each tank being therefore about 400 tons of ore in twenty-four hours.

The essential economy of the method lies in the use of a relatively cheap saline solvent as sodium chlorid or calcium chlorid to extract from the ore such proportion of the metal as can be rapidly dissolved by such solvent, acids being employed only to complete the solution, and added only in quantity equivalent to the metal remaining in the ore after the saline treatment. The amount of acid required is readily determined for each kind of ore by testing the undissolved residue from the saline treatment.

I claim:

1. The method of treating oxidized ores which consists in subjecting them to the successive action of a saline solvent and an acid solvent.

2. The method of treating oxidized ores which consists in subjecting them to the successive action of a heated saline solvent and an acid solvent.

3. The method of dissolving oxidized ores which consists in subjecting them successively to the action of a sodium chlorid solution and sulfuric acid.

4. The method of treating oxidized ores which consists in subjecting them to the action of a saline solvent, then adding an acid solvent and subjecting them to the further action of the resulting solvent solution.

5. The method of dissolving oxidized ores which consists in subjecting them to the action of a sodium chlorid solution, then adding sulfuric acid and subjecting them to the further action of the resulting solvent solution.

6. The method of treating oxidized ores which consists in subjecting them successively to the action of a saline solvent and an acid solvent, the acid being added in quantity proportionate to the amount of metal remaining undissolved by the saline treatment.

7. The method of treating oxidized ores which consists in subjecting them to the action of a saline solvent, then adding an acid solvent in quantity proportionate to the amount of metal remaining undissolved, and subjecting them to the further action of the resulting solvent solution.

In testimony whereof I affix my signature in presence of two witnesses.

WILBUR ALSON HENDRYX.

Witnesses:
THEODORA WELLS,
CHAS. R. DAVIES.